United States Patent
Czarnecki et al.

(10) Patent No.: US 10,634,029 B2
(45) Date of Patent: Apr. 28, 2020

(54) MOBILE SELECTIVE CATALYST REDUCTION SYSTEM

(71) Applicant: General Electric Technology GmbH, Baden (CH)

(72) Inventors: Lawrence Joseph Czarnecki, Knoxville, TN (US); Barath Baburao, Knoxville, TN (US); Matthew Reed Cage, Knoxville, TN (US); John Carl Buschmann, Knoxville, TN (US); Michael Thomas Lambert, Knoxville, TN (US); Alimustapha Tabikh, Vaxjo (SE); Lars Filip Lundin, Vaxjo (SE)

(73) Assignee: General Electric Technology GmbH, Baden (CH)

( * ) Notice: Subject to any disclaimer, the term of this patent is extended or adjusted under 35 U.S.C. 154(b) by 491 days.

(21) Appl. No.: 15/244,622

(22) Filed: Aug. 23, 2016

(65) Prior Publication Data
US 2018/0058292 A1    Mar. 1, 2018

(51) Int. Cl.
*F01N 3/20*    (2006.01)
*F01N 3/32*    (2006.01)
(Continued)

(52) U.S. Cl.
CPC ....... *F01N 3/2066* (2013.01); *B01D 46/0039* (2013.01); *B01D 53/8631* (2013.01);
(Continued)

(58) Field of Classification Search
CPC .... B01D 2251/2062; B01D 2258/0283; B01D 46/0039; B01D 53/8631; B01D 53/90;
(Continued)

(56) References Cited

U.S. PATENT DOCUMENTS 3,441,382 A * 4/1969 Schreuders ........... F01N 3/2853
                                                    422/180
4,131,432 A * 12/1978 Sato ................... B01D 53/8625
                                                    422/177
(Continued)

FOREIGN PATENT DOCUMENTS

EP    1 426 307 A1    6/2004
EP    2 554 814 A1    2/2013
(Continued)

OTHER PUBLICATIONS

International Search Report and Written Opinion issued in connection with corresponding PCT application No. PCT/EP2017/069807 dated Nov. 8, 2017.
(Continued)

*Primary Examiner* — Jesse S Bogue
(74) *Attorney, Agent, or Firm* — Eversheds Sutherland (US) LLP (57) ABSTRACT

The present application provides a mobile selective catalyst reduction system for use at a remote location. The mobile selective catalyst reduction system may include a first trailer with an ammonia delivery system and a tempering air system mounted thereon in whole or in part and a second trailer with a selective catalyst reduction section mounted thereon in whole or in part. The ammonia delivery system, the tempering air system, and/or the selective catalyst reduction section are permanently mounted on the first trailer or the second trailer for use at the remote location.

17 Claims, 10 Drawing Sheets

(51) Int. Cl.
| | |
|---|---|
| *F02B 63/04* | (2006.01) |
| *F01N 3/28* | (2006.01) |
| *B01D 53/86* | (2006.01) |
| *F16M 3/00* | (2006.01) |
| *B60P 3/00* | (2006.01) |
| *B01D 46/00* | (2006.01) |
| *B01D 53/94* | (2006.01) |
| *F01N 3/021* | (2006.01) |
| *F01N 13/00* | (2010.01) |
| *B01D 53/90* | (2006.01) |

(52) U.S. Cl.
CPC ............ *B01D 53/9431* (2013.01); *B60P 3/00* (2013.01); *F01N 3/021* (2013.01); *F01N 3/2892* (2013.01); *F01N 3/32* (2013.01); *F01N 13/007* (2013.01); *F02B 63/044* (2013.01); *F16M 3/00* (2013.01); *B01D 53/90* (2013.01); *B01D 2251/2062* (2013.01); *B01D 2258/0283* (2013.01); *F01N 2250/02* (2013.01); *F01N 2340/04* (2013.01); *F01N 2450/10* (2013.01); *F01N 2590/00* (2013.01); *F01N 2610/02* (2013.01); *Y02T 10/24* (2013.01)

(58) Field of Classification Search
CPC ............ B01D 53/9431; F01N 13/007; F01N 2250/02; F01N 2340/04; F01N 2450/10; F01N 2590/00; F01N 2610/02; F01N 3/021; F01N 3/2066; F01N 3/2892; F01N 3/32; F02B 63/044; F02B 65/00; F02B 2063/045; Y02T 10/24; F16M 3/00; F16M 5/00
See application file for complete search history.

(56) References Cited

U.S. PATENT DOCUMENTS

| | | | | |
|---|---|---|---|---|
| 4,726,935 | A * | 2/1988 | Inatsune | B01D 53/8631 422/171 |
| 4,925,640 | A * | 5/1990 | Morii | B01J 23/92 423/239.1 |
| 4,992,669 | A * | 2/1991 | Parmley | F01B 1/12 123/2 |
| 5,043,146 | A * | 8/1991 | Ishikawa | F01N 3/2892 422/176 |
| 5,330,728 | A * | 7/1994 | Foster | B01D 53/9454 422/177 |
| 5,431,893 | A * | 7/1995 | Hug | B01D 53/885 423/235 |
| 5,881,553 | A * | 3/1999 | Steenackers | F01N 3/28 60/299 |
| 6,334,746 | B1 * | 1/2002 | Nguyen | F16M 3/00 410/156 |
| 6,571,420 | B1 * | 6/2003 | Healy | F23J 3/00 15/301 |
| 6,765,304 | B2 * | 7/2004 | Baten | F02B 63/04 290/1 A |
| 6,786,051 | B2 * | 9/2004 | Kristich | F01D 15/10 60/796 |
| 6,893,487 | B2 * | 5/2005 | Alger | B01D 46/10 55/385.1 |
| 7,097,814 | B2 * | 8/2006 | Shishido | B01D 53/8631 422/176 |
| 7,122,913 | B2 * | 10/2006 | Witten | F02B 63/04 290/1 A |
| 7,303,730 | B2 * | 12/2007 | Shishido | B01D 53/86 138/37 |
| 7,638,107 | B1 * | 12/2009 | Wirt | B01D 53/8631 422/168 |
| 8,092,746 | B2 * | 1/2012 | Salasc | F01N 3/28 422/117 |
| 8,495,869 | B2 * | 7/2013 | Beissler | F01N 13/00 60/274 |
| 8,516,786 | B2 * | 8/2013 | Zhang | F01D 25/305 60/39.182 |
| 8,925,470 | B2 * | 1/2015 | Hart | F16M 3/00 108/55.1 |
| 9,283,520 | B2 * | 3/2016 | Ishikawa | B01D 53/8631 |
| 9,677,447 | B2 * | 6/2017 | Isada | F01N 3/2066 |
| 9,694,315 | B2 * | 7/2017 | Hjelmberg | B01D 45/08 |
| 9,840,953 | B2 * | 12/2017 | Kulkarni | F01D 25/305 |
| 10,005,016 | B2 * | 6/2018 | Kippel | B01D 46/0086 |
| 10,092,878 | B2 * | 10/2018 | Zhang | B01F 5/0643 |
| 2004/0057889 | A1 * | 3/2004 | Buzanowski | B01D 53/8631 423/235 |
| 2004/0104577 | A1 * | 6/2004 | Alger | F02B 63/04 290/1 A |
| 2004/0265198 | A1 * | 12/2004 | Biswas | B01D 53/8631 423/210 |
| 2006/0080971 | A1 * | 4/2006 | Smith | F01D 21/003 60/797 |
| 2006/0225402 | A1 * | 10/2006 | Kierspe | F02C 3/30 60/39.5 |
| 2011/0036066 | A1 * | 2/2011 | Zhang | F01D 25/305 60/39.5 |
| 2011/0158876 | A1 * | 6/2011 | Buzanowski | F02C 3/20 423/239.1 |
| 2012/0102929 | A1 | 5/2012 | Beissler et al. | |
| 2012/0153634 | A1 * | 6/2012 | Williams | F01K 13/00 290/1 R |
| 2012/0174586 | A1 * | 7/2012 | Alexander | F01D 25/30 60/694 |
| 2016/0308419 | A1 * | 10/2016 | Sethi | H02K 5/24 |

FOREIGN PATENT DOCUMENTS

| | | |
|---|---|---|
| EP | 2 687 700 A2 | 1/2014 |
| EP | 2 910 711 A1 | 8/2015 |
| KR | 20110111644 A | 10/2011 |

OTHER PUBLICATIONS

Tabikh et al., Tempering air system for gas turbine selective catalyst reduction system, GE co-pending U.S. Appl. No. 15/334,900, filed Oct. 26, 2016.

Tabikh et al., Tempering air system for gas turbine selective catalyst reduction system, GE co-pending U.S. Appl. No. 15/158,873, filed May 19, 2016.

\* cited by examiner

MOBILE SELECTIVE CATALYST REDUCTION SYSTEM

TECHNICAL FIELD

The present application and the resultant patent relate generally to gas turbine engines and more particularly relate to a mobile selective catalyst reduction system for controlling nitrogen oxides and other types of emission in hot combustion gases produced by a gas turbine.

BACKGROUND OF THE INVENTION

In the combustion process of a gas turbine engine, nitrogen oxides and other types of regulated emissions are produced. Specifically, a simple cycle gas turbine emits hot flue gases that contain unacceptable levels of nitrogen oxides. One solution for reducing the overall levels of nitrogen oxide emissions is the use of a selective catalyst reduction system. Generally described, the selective catalyst reduction system adds a reductant, typically ammonia or urea, to the hot combustion gas stream before passing the combustion gas stream through a catalyst bed so as to absorb selectively the nitrogen oxides and the reducing agent. The absorbed components undergo a chemical reaction on the catalyst surface and the reaction products are desorbed. Specifically, the reactant reacts with the nitrogen oxides in the combustion gas stream to form water and nitrogen. Other types of catalysts and other types of reductants may be used.

The overall efficiency of the selective catalyst reduction system may depend at least in part on the temperature of the hot combustion gas stream. Specifically, the efficient temperature range of the selective catalyst reduction system may be relatively narrow. As such, the hot combustion gas stream generally should be sufficiently cooled before reaching the catalyst bed. Moreover, careful metering and distribution of the reductant to the combustion gas stream upstream of the catalyst bed may be required for the selective catalyst reduction system to convert and remove a sufficient level of the nitrogen oxides.

Mobile, simple cycle combustion turbine-generators may be delivered and operated at remote locations with immediately power needs. These combustion turbine-generators may require emission control systems to minimize nitrogen oxide emissions from the combustion turbine so as to meet applicable emission requirements. The exhaust gas quality and the overall design of the exhaust systems in these simple cycle combustion turbines, however, may not be suitable for treatment by known types of selective catalyst reduction technology. Specifically, selective catalyst reduction technology generally may be applied to simple cycle turbine exhaust after cooling treatments also have been applied. Selective catalyst reduction technology also may require ammonia reagent delivery systems and catalyst layers. The common delivery of a selective catalyst reduction system thus generally requires substantial erection, assembly, and other basic construction activities at the final turbine-generator location. Often, there may be limited skilled labor available at the remote location to perform the construction and it may be expensive to bring sufficient skilled labor to such a remote location. The design and construction methods used for these common selective catalyst reduction systems thus may make them substantially unsuitable for transport.

SUMMARY OF THE INVENTION

The present application and the resultant patent thus provide a mobile selective catalyst reduction system for use at a remote location. The mobile selective catalyst reduction system may include a first trailer with an ammonia delivery system and a tempering air system mounted thereon in whole or in part and a second trailer with a selective catalyst reduction section mounted thereon in whole or in part. The ammonia delivery system, the tempering air system, and/or the selective catalyst reduction section are permanently mounted on the first trailer or the second trailer for use at the remote location.

The present application and the resultant patent further provide a method of providing selective catalyst reduction to a flow of combustion gases produced by a turbine engine. The method may include the steps of mounting an ammonia delivery system and a tempering air system of a selective catalyst reduction system on a first trailer, mounting a selective catalyst reduction section of the selective catalyst reduction system on a second trailer, transporting the first trailer and the second trailer to the turbine engine, connecting the selective catalyst reduction section, the ammonia delivery system, and the tempering air system at the turbine engine, and connecting the selective catalyst reduction system to the turbine engine.

The present application and the resultant patent further provide a mobile selective catalyst reduction system for use at a remote location. The mobile selective catalyst reduction system may include a first trailer with an ammonia skid and a tempering air skid mounted thereon and a second trailer with a selective catalyst reduction section and an exhaust duct mounted thereon in whole or in part.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
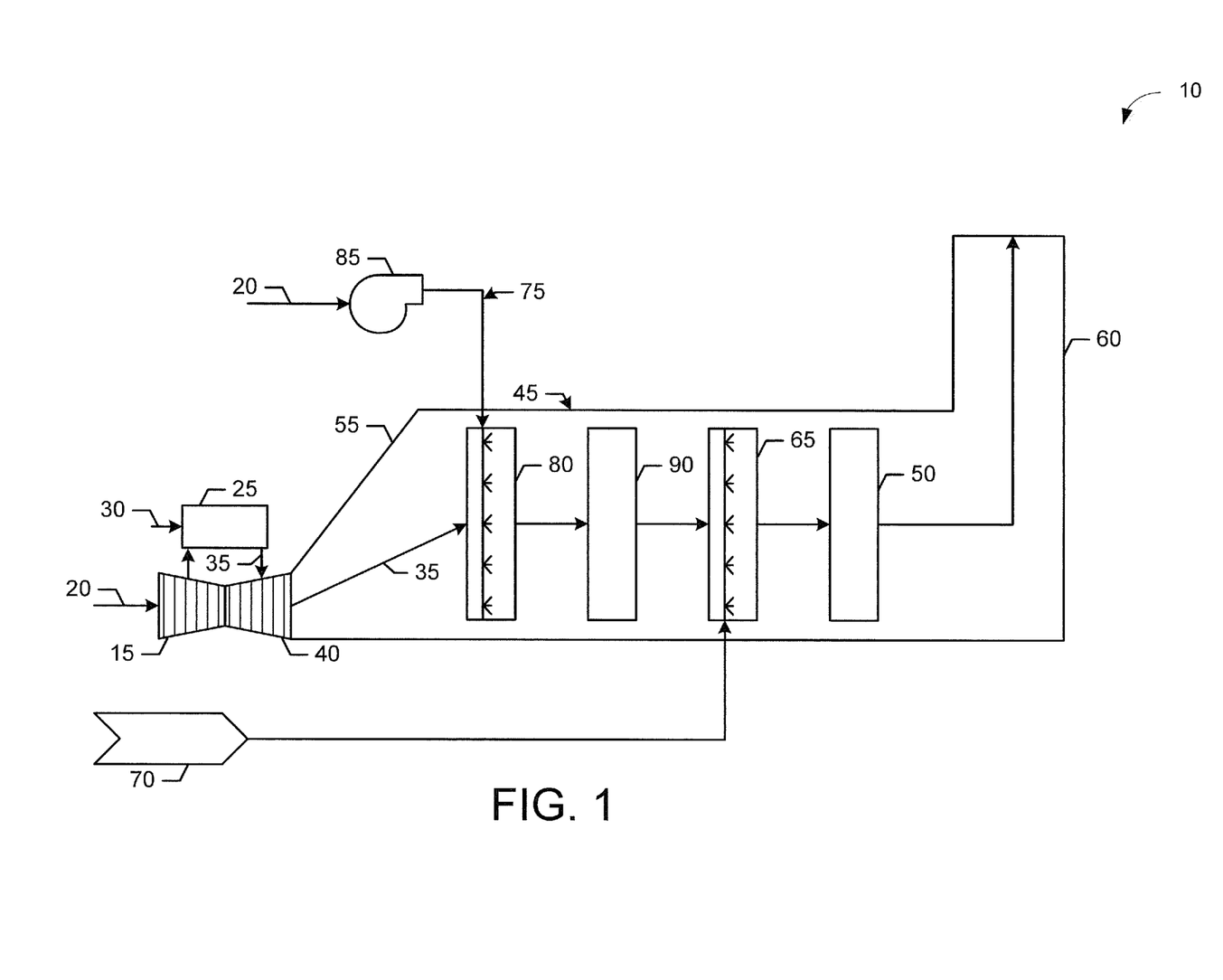
FIG. 1 is a schematic diagram of a gas turbine engine showing a compressor, a combustor, a turbine, a load, and an example of a selective catalyst reduction system.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array and the like. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft and an external load such as an electrical generator and the like.

The gas turbine engine 10 may use natural gas, various types of syngas, liquid fuels, and/or other types of fuels and blends thereof. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may include a selective catalyst reduction system 45. The selective catalyst reduction system 45 may be positioned downstream of the turbine 40. As described above, the selective catalyst reduction system 45 may include a catalyst 50 therein so as to react with the combustion gas stream 35. The catalyst 50 may be of conventional design and may be manufactured from suitable carrier and active catalytic components. Different types of catalysts 50 may be used herein. The catalyst 50 may have any suitable size, shape, or configuration. The selective catalyst reduction system 45 may extend from an inlet 55 to a stack 60 or other type of exhaust. An ammonia injection grid 65 may be positioned about the catalyst 50 so as to inject a reductant such as ammonia into the combustion gas stream 35. The ammonia injection grid 65 may be in communication with an ammonia source 70. The ammonia injection grid 65 may be in communication with the ammonia source 70 via an extensive piping system to produce an adequate ammonia distribution into the incoming combustion gas stream 35. The stack 60 or other type of exhaust may be positioned downstream of the catalyst 50.

The selective catalyst reduction system 45 also may include a tempering air system 75. The tempering air system 75 may reduce the temperature of the combustion gas stream 35 with the introduction of ambient air 20 and the like before the stream 35 reaches the catalyst 50. The tempering air system 75 may include a tempering air grid 80 positioned about the inlet 55 of the selective catalyst reduction system 45 and upstream of the ammonia injection grid 65 and the catalyst 50. The tempering air grid 80 may be in communication with a source of ambient air 20 via a tempering air fan 85 or other type of air movement device. A gas mixer 90 may be positioned downstream of the tempering air grid 80. The gas mixer 90 may include a series of baffles and the like. The gas mixer 90 may mix the incoming combustion gas stream 35 and the ambient air 20 so as to obtain an adequate temperature distribution therein. The now cooled flow then may flow past the ammonia injection grid 65 and the catalyst 50 for reaction therewith. The selective catalyst reduction system 45 described herein is for the purpose of example only. Many other types of selective catalyst reduction systems and components may be used herein.

Figure 2:
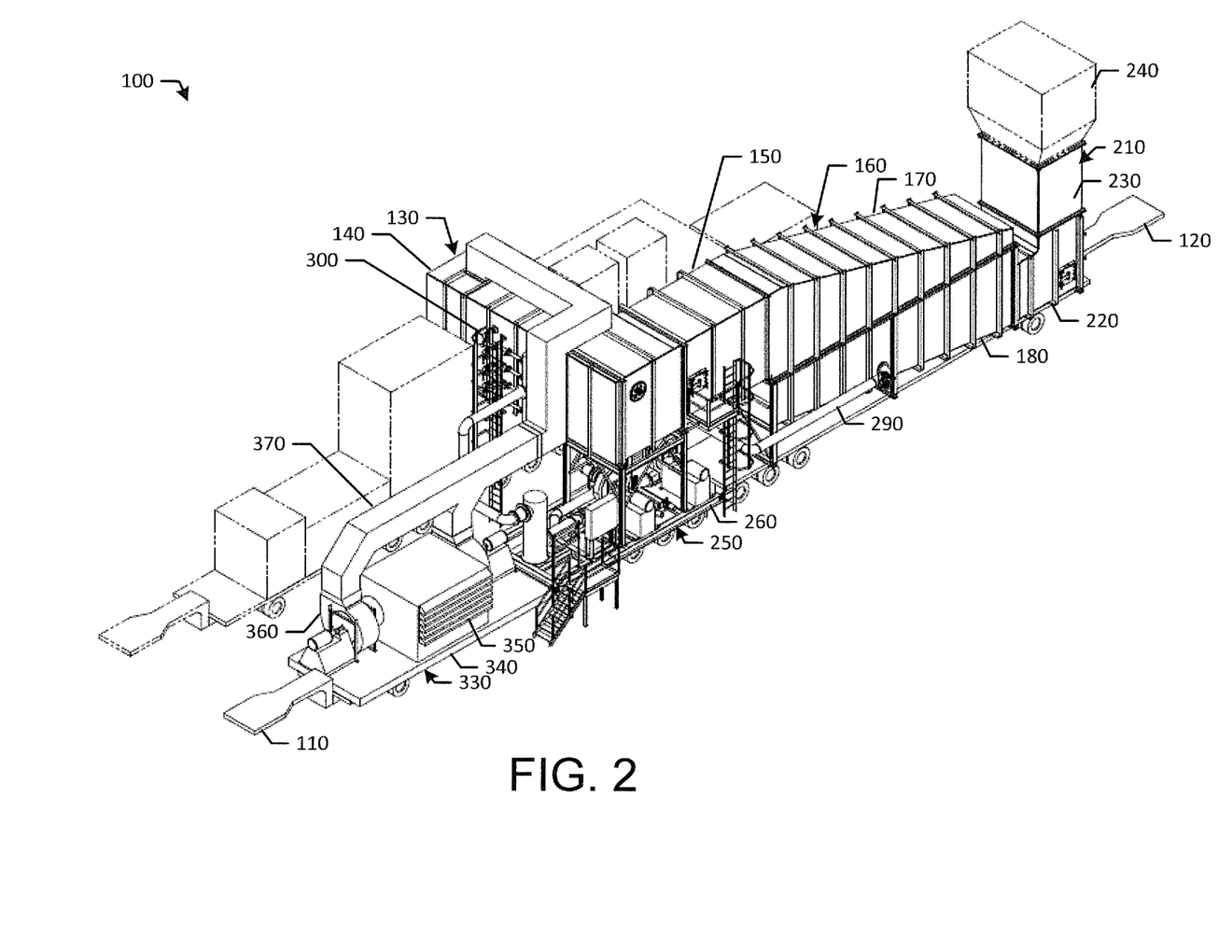
FIG. 2 is a schematic diagram of a mobile selective catalyst reduction system as may be described herein.
Figure 3:
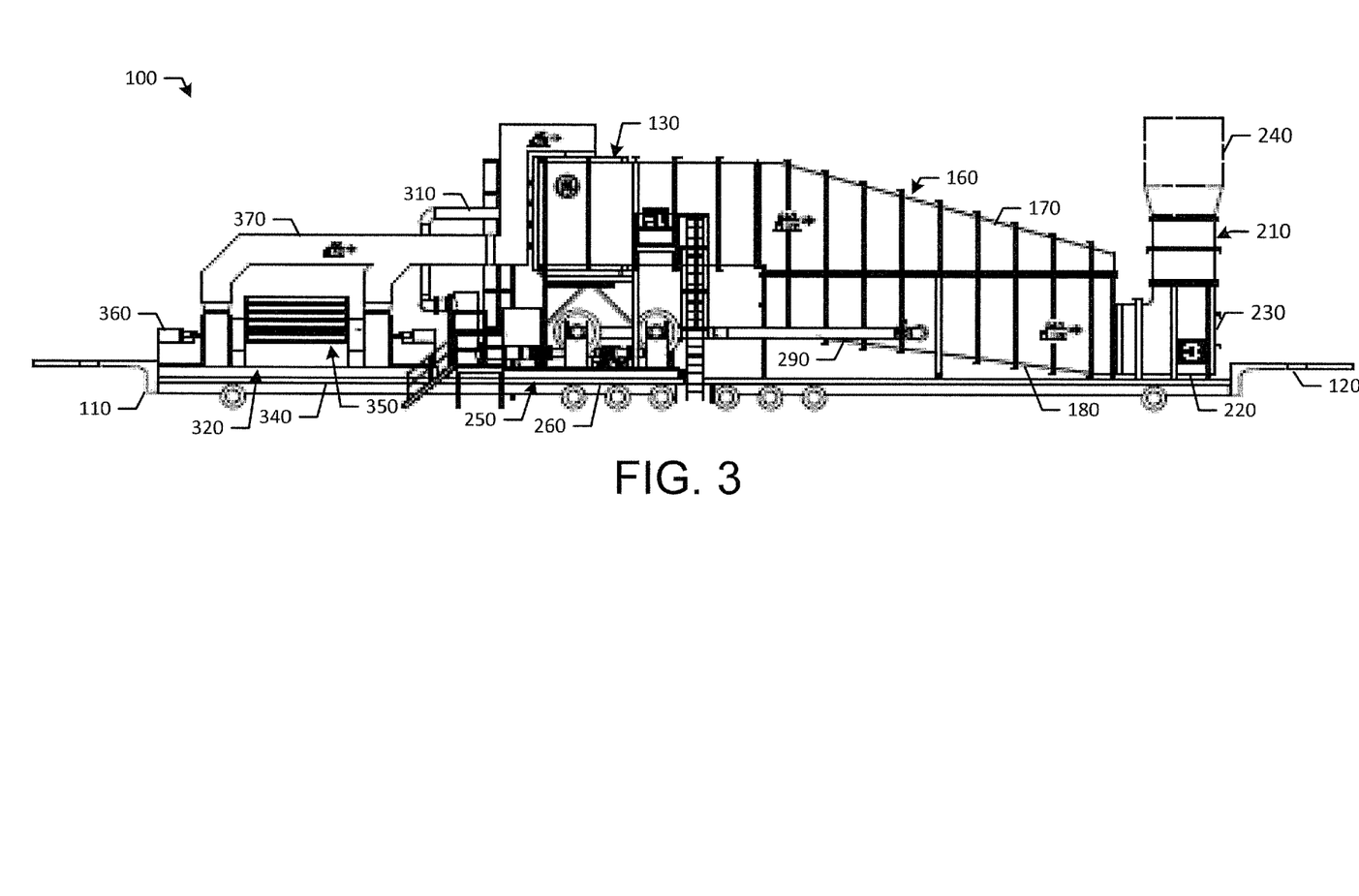
FIG. 3 is a side plan view of the mobile selective catalyst reduction system of FIG. 2.
Figure 4:
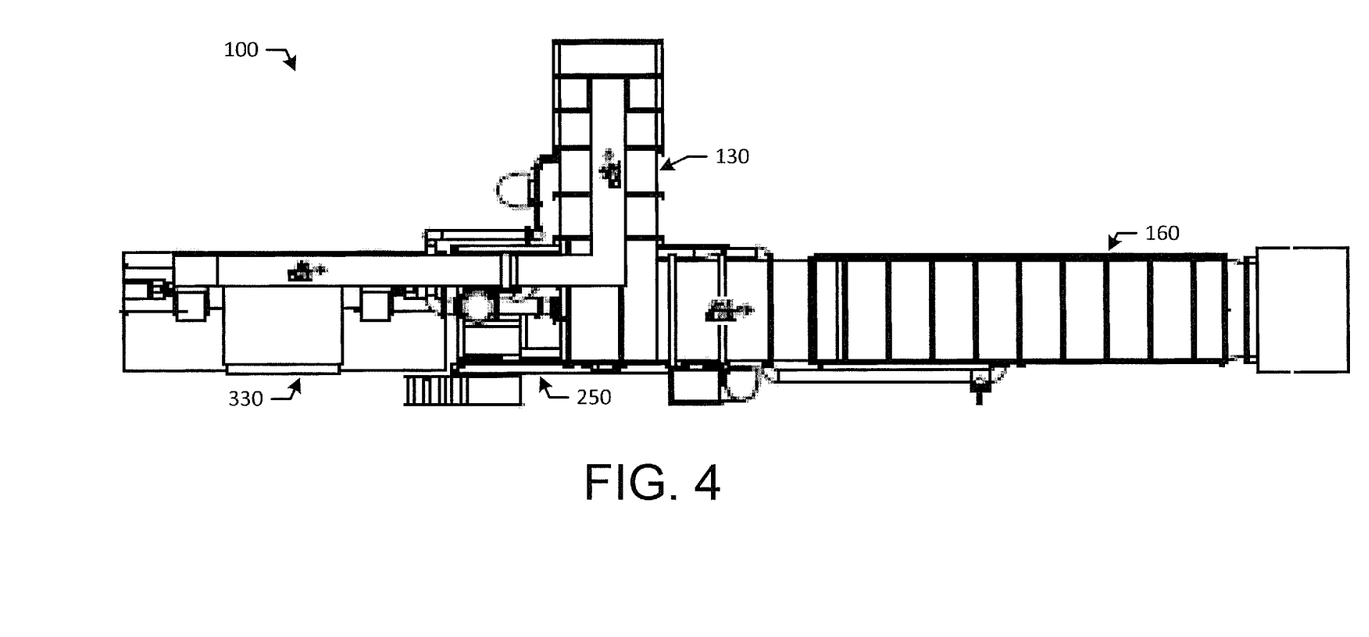
FIG. 4 is a top plan view of the mobile selective catalyst reduction system of FIG. 2.
Figure 5:
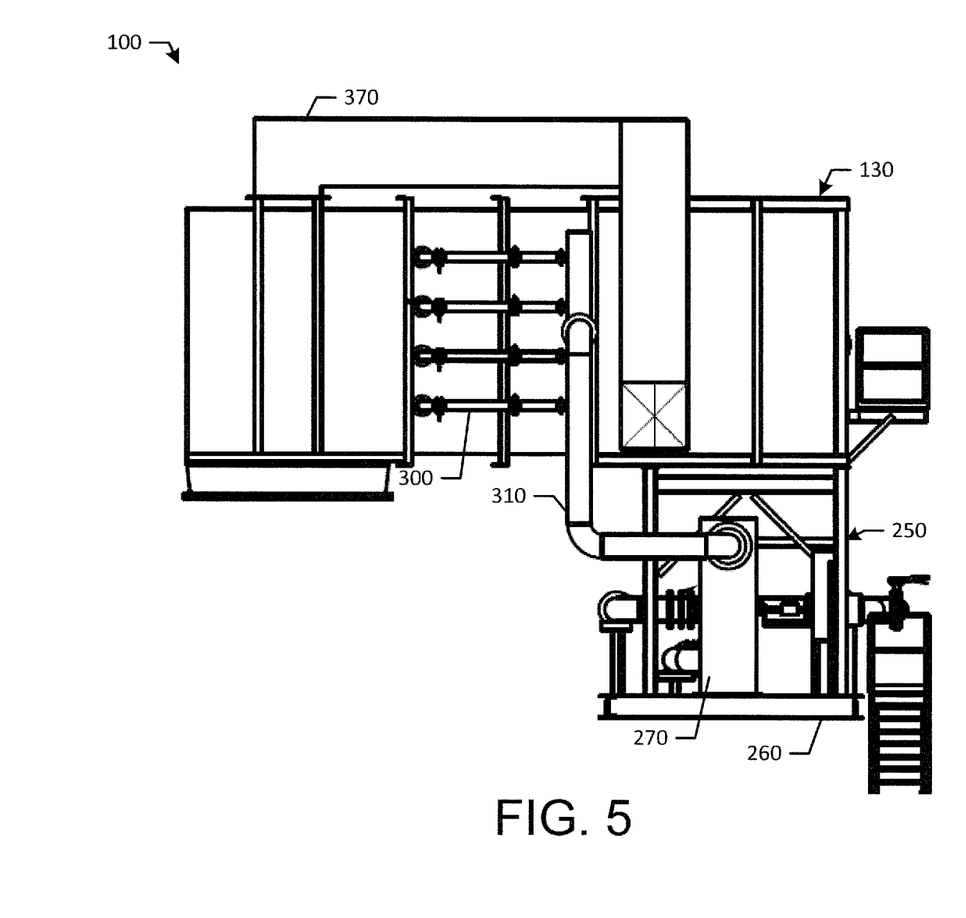
FIG. 5 is a rear plan view of the mobile selective catalyst reduction system of FIG. 2.

FIG. 2 show an example of a mobile selective catalyst reduction system 100 as may be described herein. The mobile selective catalyst reduction system 100 may be used with the gas turbine engine 10 and the like so as to treat the combustion gas stream 35. The mobile selective catalyst reduction system 100 may include a first or a skid trailer 110 and a second or a SCR trailer 120. As will be described in more detail below, certain components of the mobile selective catalyst reduction system 100 may be permanently mounted on the skid trailer 110 and the SCR trailer 120 while the other components may be transported via other trailers and/or other means. The trailers 110, 120 may be of conventional design and may have any suitable size, shape, or configuration.

Figure 6:
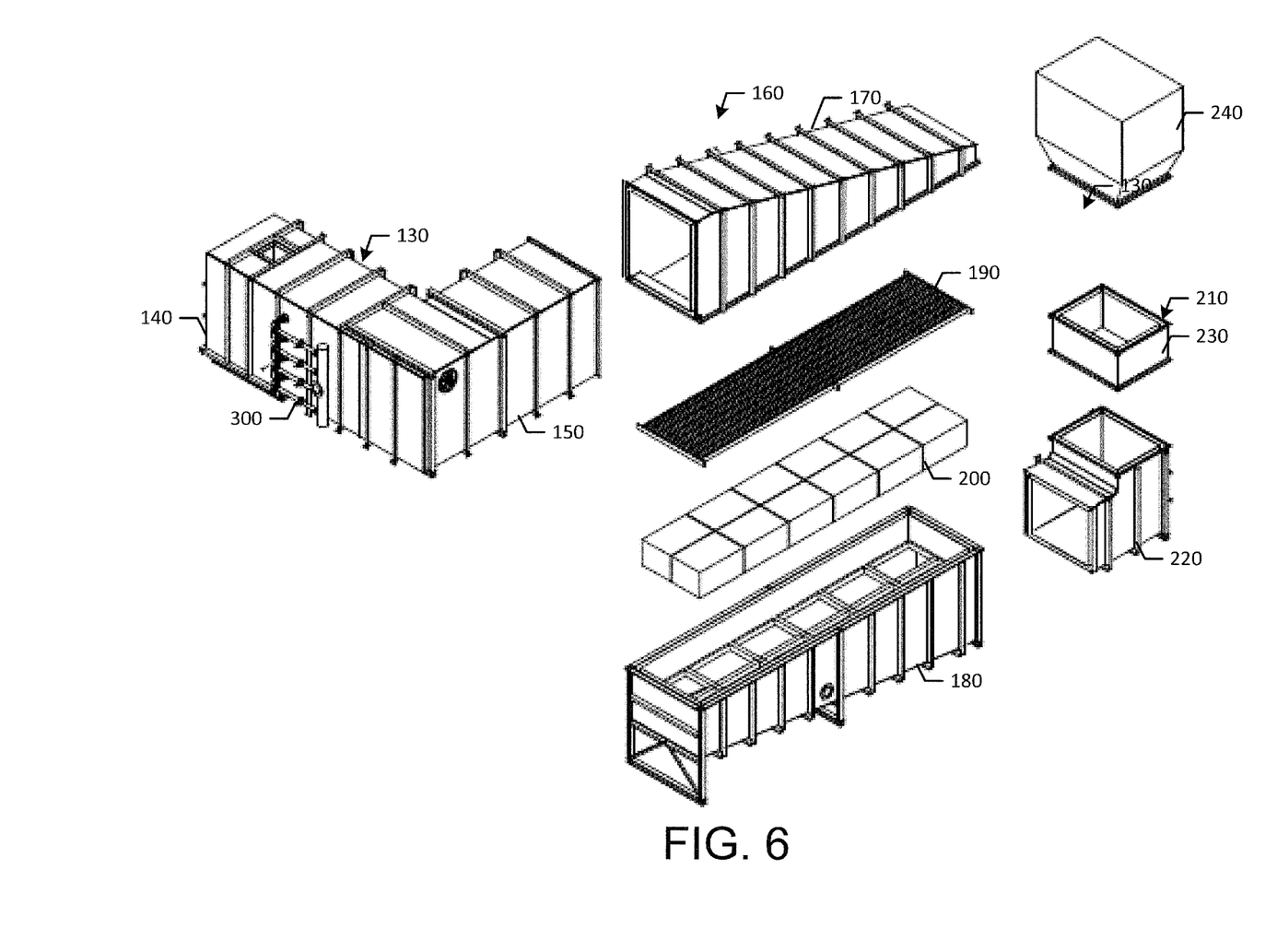
FIG. 6 is an exploded view of the inlet duct work of the mobile selective catalyst reduction system of FIG. 2.

The mobile selective catalyst reduction system 100 may include one or more inlet ducts 130 in communication with the hot combustion gas steam 35 from the gas turbine engine 10. In this example, a first inlet duct 140 and a second inlet duct 150 in a perpendicular orientation are shown, although any number or configuration may be used. The inlet ducts 130 may be substantially assembled prior to transport with only minor connections required on site. The inlet ducts 130 may have any suitable size, shape, or configuration.

Figure 7:
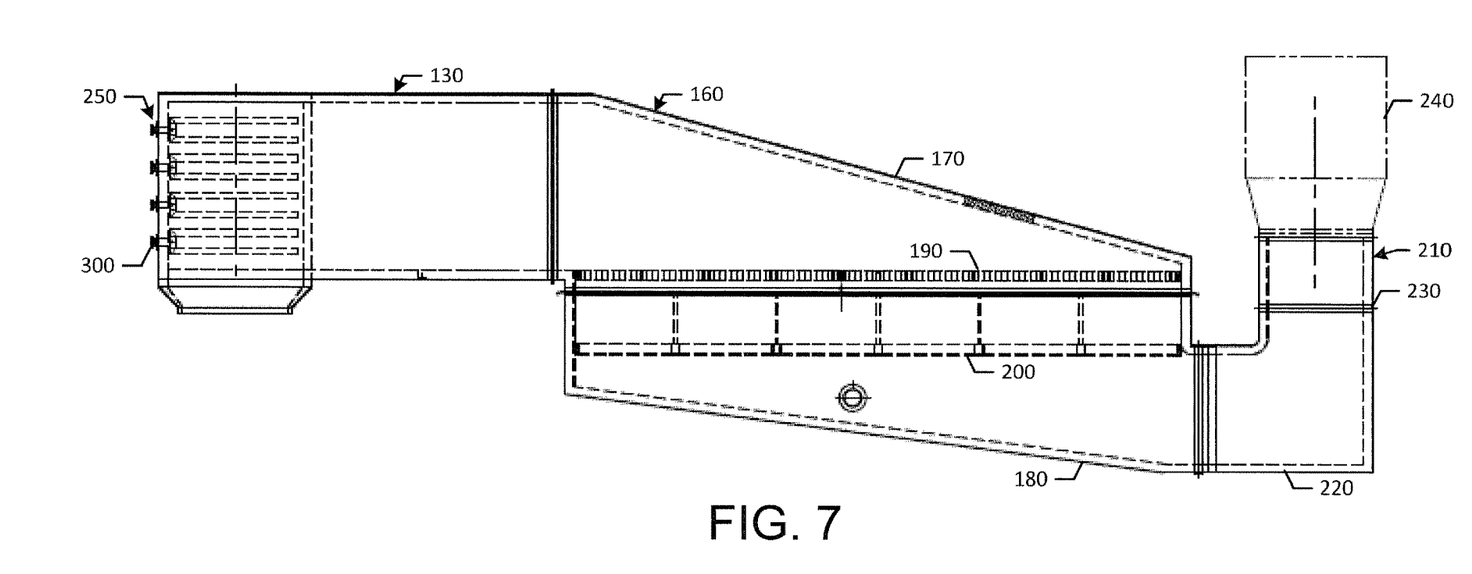
FIG. 7 is a partial section view of the selective catalyst reduction transition sections of the mobile selective catalyst reduction system of FIG. 2.

A selective catalyst reduction section 160 may be positioned downstream of the inlet ducts 130. The selective catalyst reduction section 160 may include an SCR inlet transition section 170 and an SCR outlet transition section 180. A rectifier layer 190 and a catalyst 200 may be positioned between the SCR inlet transition section 170 and the SCR outlet transition section 180. The rectifier layer 190 and the catalyst 200 may be of conventional design and may be manufactured from suitable carrier and active catalytic components. Different types of catalysts 200 may be used herein in any suitable size, shape, or configuration. In this example, the SCR transition sections 170, 180 may have substantially opposing triangular shapes with the SCR inlet transition section 170 narrowing along its length towards the rectifier layer 190 and the catalyst 200 and the SCR outlet transition section 180 expanding therealong. The SCR transition sections 170, 180 may have any suitable size, shape, or configuration. The SCR outlet transition section 180 and the catalyst 200 may be permanently mounted onto the SCR trailer 120 with the SCR inlet transition section 170 and the rectifier layer 190 being transported separately and assembled on site. Other components and other configurations may be used herein.

An exhaust duct 210 may be positioned downstream of the selective catalyst reduction section 160. The exhaust duct 210 may have an exhaust inlet 220 and a perpendicular exhaust outlet 230. The exhaust duct 210 and the components thereof may have any suitable size, shape, or configuration. The exhaust inlet 220 of the exhaust duct 210 may be permanently mounted onto the SCR trailer 120. An exhaust silencer 240 may be positioned downstream of the exhaust duct 210. The exhaust silencer 240 may be of conventional design and may have any suitable size, shape, or configuration. Other components and other configurations may be used herein.

Figure 9:
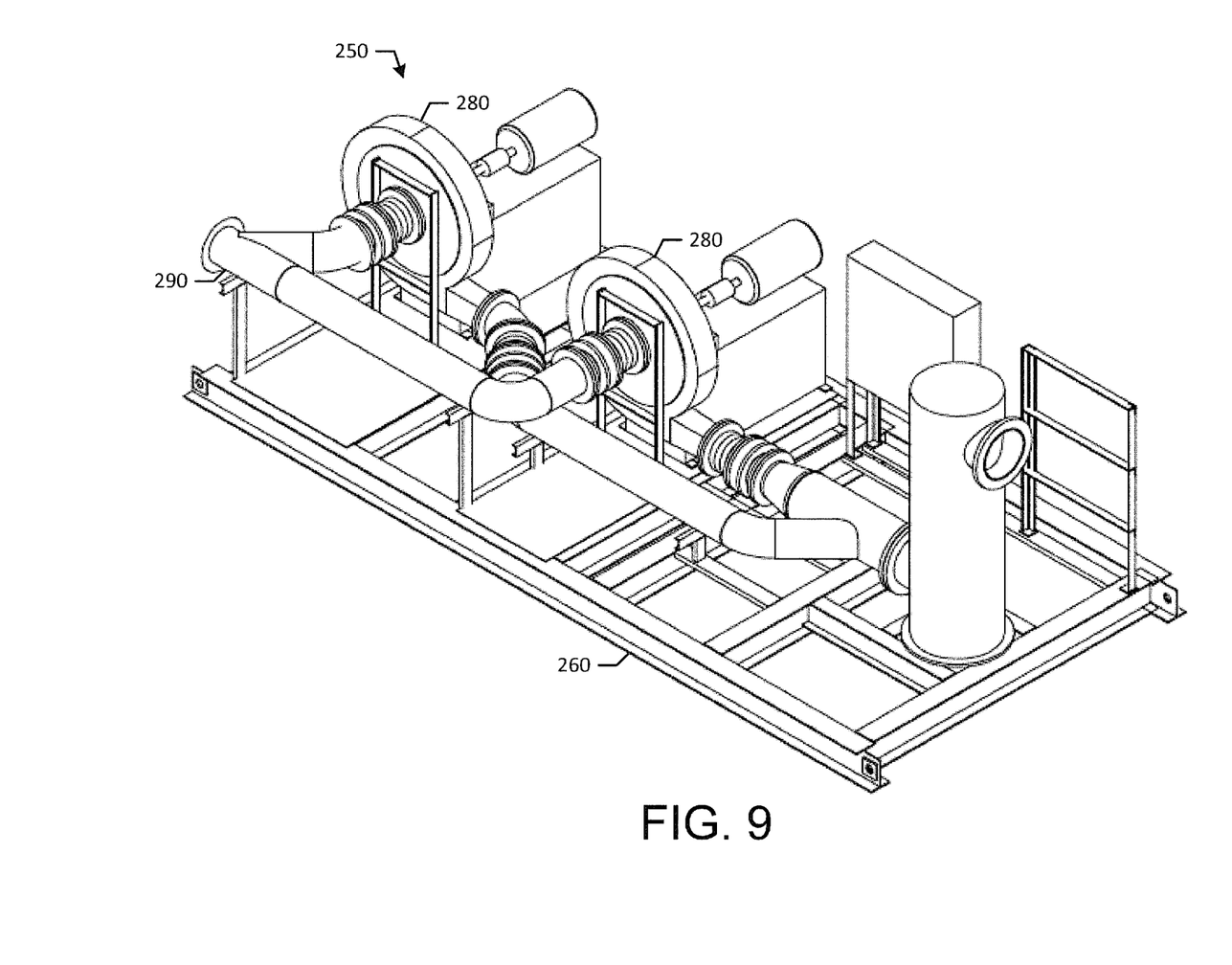
FIG. 9 is a partial perspective view of the ammonia delivery system of the mobile selective catalyst reduction system of FIG. 2.

The mobile selective catalyst reduction system 100 may include an ammonia delivery system 250. The ammonia delivery system 250 may include an ammonia vaporization skid 260. The ammonia vaporization skid 260 may be permanently mounted on the skid trailer 110. An ammonia vaporizer 270 may be positioned on the ammonia vaporization skid 260. The ammonia vaporizer 270 may be of conventional design and may have any suitable size, shape, or configuration. One or more dilution air blowers 280 may be positioned on the ammonia vaporization skid 260. The dilution air blowers 280 may be of conventional design and may have any suitable size, shape, or configuration. The dilution air blowers 280 may receive a flow of dilution air from the selective catalyst reduction section 160 in a dilution air pipe 290 or elsewhere for use in the ammonia vaporizer 270. The components of the ammonia vaporization skid 260 may be permanently mounted onto the skid trailer 210.

Figure 8:
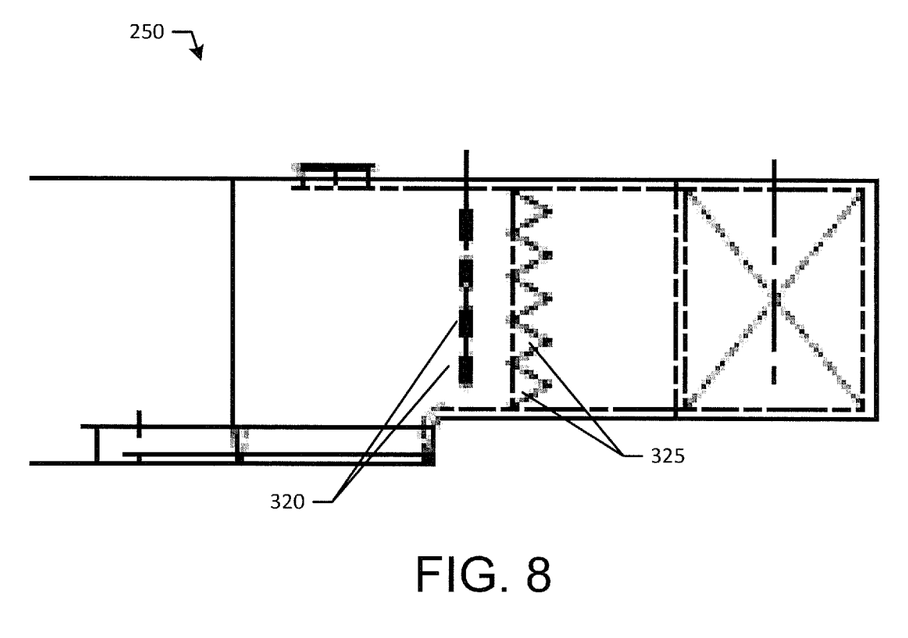
FIG. 8 is a partial sectional view of the ammonia injection grid and the mixing vanes of the mobile selective catalyst reduction system of FIG. 2.

The ammonia delivery system 250 may include an ammonia injection grid 300. The ammonia injection grid 300 may be positioned on the inlet duct 130 upstream of the catalyst 200. The ammonia injection grid 300 may be in communication with the ammonia vaporizer 270 via an ammonia inlet pipe 310 and the like. The ammonia injection grid 300 may include a number of ammonia nozzles 320 positioned within the inlet duct 130. The ammonia injection grid 270 and the ammonia nozzles 320 may have any suitable size, shape, or configuration. A number of mixing vanes 325 and the like may be positioned downstream of the ammonia nozzles 320. The mixing vanes 325 may include a series of baffles and the like. The mixing vanes 325 may have any suitable size, shape, or configuration. The ammonia injection grid 310 may be attached to the inlet duct 130 prior to transport and connected to the ammonia vaporization skid 260 and the components thereof on site. Other components and other configurations may be used herein.

The mobile selective catalyst reduction system 100 may include a tempering air system 330. The tempering air system 330 may include a tempering air skid 340. The tempering air skid 340 may be permanently attached to the skid trailer 110. The tempering air skid 340 may include an air filter 350 and one or more blowers 360 positioned thereon. The air filters 350 and the blowers 360 may be of conventional design and may have any suitable size, shape, or configuration. The tempering air system 330 may include a tempering air duct 370 and the like. The tempering air duct 370 may connect the air blowers 360 and the inlet duct 130 so at provide a flow of tempering air thereto. The tempering air duct 370 may have any suitable size, shape, or configuration. The tempering air duct 370 may be transported separately from the tempering air skid 340 and then may be connected on site. Other components and other configurations may be used herein.

Figure 10:
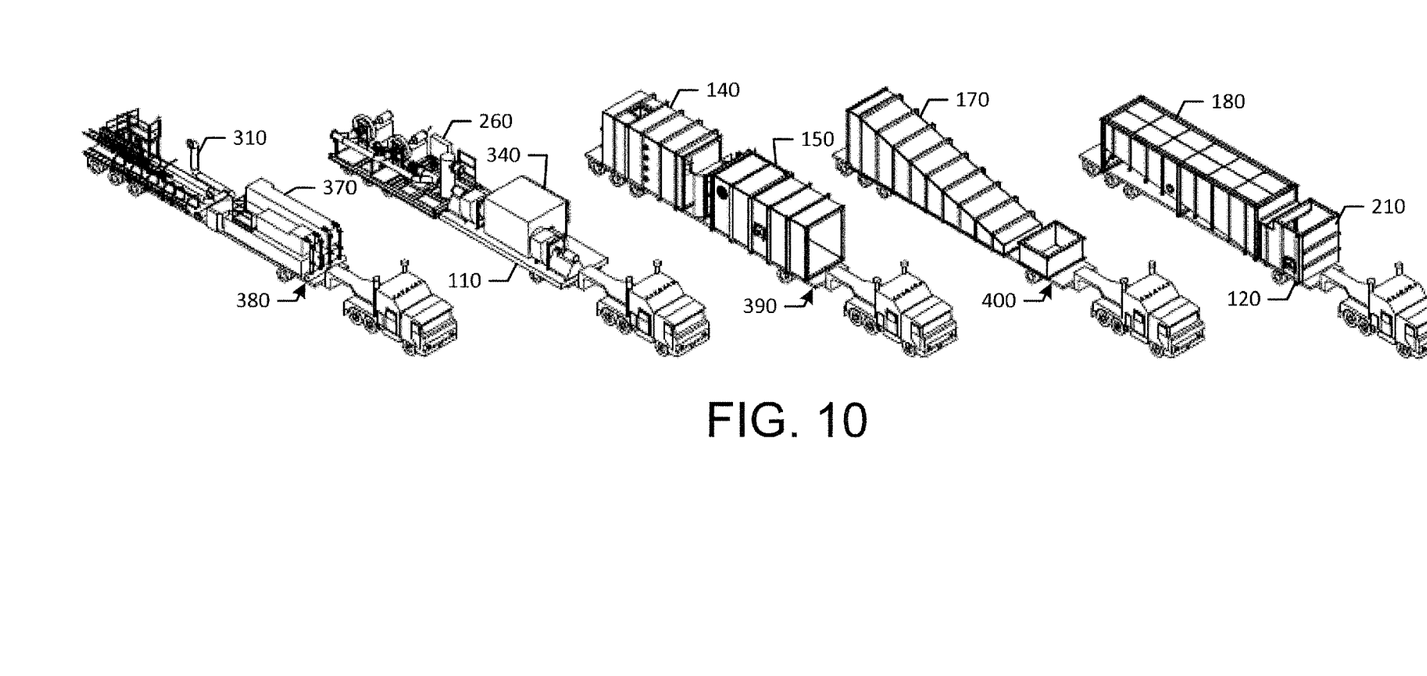
FIG. 10 a perspective view of a shipping configuration for the mobile selective catalyst reduction system of FIG. 2.

In use, the ammonia injection skid 260 and the tempering air skid 340 may be permanently attached to the skid trailer 110. Likewise, the SCR outlet transition section 180 and the exhaust inlet 220 of the exhaust duct 210 may be permanently attached to the SCR trailer 120. In this example, the ammonia inlet piping 310 and the tempering air ducts 370 may be transported on a third trailer 380; the inlet ducts 130 may be transported on a fourth trailer 390; and the SCR inlet transition section 170 may be transported on a fifth trailer 400. Other components may be mounted in other configurations and/or on other trailers and/or other means of transport. Once on site, the components of the skid trailer 110 and the SCR trailer 120 may be connected and the remaining components may be attached thereto. The mobile selective catalyst reduction system 100 then may be connected to the gas turbine engine 10 and the like for emissions control operation as is described above. Other components and other configurations may be used herein.

The mobile selective catalyst reduction system 100 thus may be transported and assembled in a quick and efficient manner in any type of remote location that may be reached via conventional trailers, tractors, and the like. Moreover, transport via rail, sea, air, and/or combinations thereof also could be used herein. The mobile selective catalyst reduction system 100 provides for the assembly of complex or time consuming components where convenient with later transport to the remote location. The mobile selective catalyst reduction system 100 thus may provide efficient emissions control with a significant reduction in time and overall expense. We note that by stating that a component is "permanently" mounted to a trailer, we mean that the component is fixedly attached to the trailer such that the component does not need to be separated again from the trailer before operations begin.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A mobile selective catalyst reduction system for use at a remote location, comprising:
   a first trailer;
   the first trailer comprises an ammonia delivery system and a temperature tempering air system permanently mounted thereon in whole or in part for use at the remote location; and
   a second trailer;
   the second trailer comprising a selective catalyst reduction section permanently mounted thereon in whole or in part for use at the remote location;
   wherein the selective catalyst reduction section comprises a catalyst, an inlet transition section narrowing in a vertical direction on a first side of the catalyst, and an outlet transition section expanding in the vertical direction on a second side of the catalyst; wherein the catalyst and the outlet transition section of the selective catalyst reduction section are permanently mounted on the second trailer and wherein the inlet transition section is transported separately from the second trailer.

2. The mobile selective catalyst reduction system of claim 1, wherein the first trailer comprises a skid trailer and wherein the second trailer comprises a selective catalyst reduction trailer.

3. The mobile selective catalyst reduction system of claim 1, further comprising one or more inlet ducts in communication with the ammonia delivery system, the temperature tempering air system, and the selective catalyst reduction section.

4. The mobile selective catalyst reduction system of claim 1, further comprising an exhaust duct in communication with the selective catalyst reduction section.

5. The mobile selective catalyst reduction system of claim 4, wherein the exhaust duct comprises an exhaust inlet and an exhaust outlet.

6. The mobile selective catalyst reduction system of claim 5, wherein the exhaust inlet is mounted on the second trailer.

7. The mobile selective catalyst reduction system of claim 4, wherein the exhaust duct comprises a silencer.

8. The mobile selective catalyst reduction system of claim 1, wherein the ammonia delivery system comprises an ammonia skid mounted on the first trailer.

9. The mobile selective catalyst reduction system of claim 8, wherein the ammonia skid comprises a vaporizer and a dilution air blower.

10. The mobile selective catalyst reduction system of claim 1, wherein the temperature tempering air system comprises a tempering air skid mounted on the first trailer.

11. The mobile selective catalyst reduction system of claim 10, wherein the tempering air skid comprises an air filter and a blower.

12. The mobile selective catalyst reduction system of claim 1, wherein a combustion gas stream passes through the catalyst in the vertical direction.

13. A mobile selective catalyst reduction system for use at a remote location, comprising:
   a first trailer;
   the first trailer comprising an ammonia skid and a temperature tempering air skid mounted thereon; and
   a second trailer;
   the second trailer comprising a selective catalyst reduction section and an exhaust duct mounted thereon in whole or in par;
   wherein the selective catalyst reduction section comprises a catalyst, an inlet transition section narrowing in a vertical direction on a first side of the catalyst, and an outlet transition section expanding in the vertical direction on a second side of the catalyst in communication with the exhaust duct; wherein the catalyst and the outlet transition section of the selective catalyst reduction section are permanently mounted on the second trailer and wherein the inlet transition section is transported separately from the second trailer.

14. The mobile selective catalyst reduction system of claim 13, wherein the exhaust duct comprises an exhaust inlet mounted on the second trailer.

15. The mobile selective catalyst reduction system of claim 13, wherein the ammonia skid comprises a vaporizer and a dilution air blower.

16. The mobile selective catalyst reduction system of claim 13, wherein the temperature tempering air skid comprises an air filter and a blower.

17. The mobile selective catalyst reduction system of claim 13, wherein a combustion gas stream passes through the catalyst in the vertical direction.

* * * * *